United States Patent
Qi et al.

(10) Patent No.: US 12,348,138 B2
(45) Date of Patent: Jul. 1, 2025

(54) MULTILEVEL SELF-BALANCE CONTROL CIRCUIT, DC/DC CONVERSION SYSTEM AND AC/DC CONVERSION SYSTEM

(71) Applicant: Silergy Semiconductor Technology (Hangzhou) LTD, Hangzhou (CN)

(72) Inventors: Yu Qi, Hangzhou (CN); Wei Chen, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 256 days.

(21) Appl. No.: 17/975,778

(22) Filed: Oct. 28, 2022

(65) Prior Publication Data

US 2023/0155502 A1    May 18, 2023

(30) Foreign Application Priority Data

Nov. 12, 2021  (CN) .......................... 202111341819.0

(51) Int. Cl.
*H02M 3/07*    (2006.01)
*H02M 3/00*    (2006.01)
(Continued)

(52) U.S. Cl.
CPC .............. *H02M 3/158* (2013.01); *H02M 3/01* (2021.05); *H02M 3/07* (2013.01); *H02M 3/33569* (2013.01); *H02M 7/04* (2013.01)

(58) Field of Classification Search
CPC .............. H02M 3/158; H02M 3/33569; H02M 3/07–073
See application file for complete search history.

(56) References Cited

U.S. PATENT DOCUMENTS

| 8,581,518 B2 | 11/2013 | Kuang et al. |
| 2011/0127925 A1 | 6/2011 | Huang et al. |

(Continued)

FOREIGN PATENT DOCUMENTS

| CN | 110829872 A | * | 2/2020 | .............. H02M 1/32 |
| CN | 111245271 A | * | 6/2020 | .............. H02M 1/32 |

(Continued)

OTHER PUBLICATIONS

Rong Guo "A Multi-Modes Charge-Pump Based High Efficiency Wide Input Range DC-DC Converter", Sep. 12, 2010 (Year: 2010).*

*Primary Examiner* — Sisay G Tiku

(57) ABSTRACT

A multilevel self-balance control circuit can include: a voltage divider unit configured to receive and divide an input voltage; a voltage-controlled charge source load coupled to an output terminal of the voltage divider unit, and being configured to adaptively adjust charge amount input to the voltage-controlled charge source load based on an output voltage of the voltage divider unit, such that a total amount of charges flowing through the voltage-controlled charge source load during a period of each working state of the voltage divider unit is positively correlated with the output voltage of the voltage divider unit, thereby forming a negative feedback loop to achieve voltage balancing of the voltage divider unit; and a control unit configured to generate control signals for the voltage divider unit and the voltage-controlled charge source load, thereby coordinately controlling the voltage divider unit and the voltage-controlled charge source load.

17 Claims, 16 Drawing Sheets

(51) Int. Cl.
*H02M 3/158* (2006.01)
*H02M 3/335* (2006.01)
*H02M 7/04* (2006.01)

(56) References Cited

U.S. PATENT DOCUMENTS

| | | | |
|---|---|---|---|
| 2017/0163157 A1* | 6/2017 | Petersen | H02M 1/14 |
| 2017/0318639 A1 | 11/2017 | Wang et al. | |
| 2018/0295685 A1 | 10/2018 | Wang et al. | |
| 2018/0295690 A1 | 10/2018 | Chen et al. | |
| 2018/0310376 A1 | 10/2018 | Huang et al. | |
| 2020/0028445 A1* | 1/2020 | Norambuena Valdivia | H02M 7/5387 |
| 2020/0336067 A1* | 10/2020 | Petersen | H02M 7/4837 |
| 2021/0359606 A1 | 12/2021 | Han et al. | |
| 2022/0029540 A1 | 1/2022 | Zhang et al. | |
| 2022/0123651 A1* | 4/2022 | Gu | H02M 7/4837 |
| 2022/0190712 A1* | 6/2022 | Chen | H02M 1/4225 |

FOREIGN PATENT DOCUMENTS

| | | | | |
|---|---|---|---|---|
| CN | 112636621 A | * | 4/2021 | |
| CN | 112994494 A | * | 6/2021 | H02M 3/1584 |
| CN | 114389447 A | * | 4/2022 | |
| CN | 116131602 A | * | 5/2023 | |
| CN | 117424476 A | * | 1/2024 | |
| CN | 221283041 U | * | 7/2024 | H02M 1/007 |
| EP | 3236576 A1 | * | 10/2017 | G05B 15/02 |
| WO | WO-2019224253 A1 | * | 11/2019 | G01R 19/16538 |
| WO | WO-2024031184 A1 | * | 2/2024 | H02M 1/0095 |

\* cited by examiner

MULTILEVEL SELF-BALANCE CONTROL CIRCUIT, DC/DC CONVERSION SYSTEM AND AC/DC CONVERSION SYSTEM

RELATED APPLICATIONS

This application claims the benefit of Chinese Patent Application No. 202111341819.0, filed on Nov. 12, 2021, which is incorporated herein by reference in its entirety.

FIELD OF THE INVENTION

The present invention generally relates to the field of power electronics, and more particularly to multilevel self-balance control circuits, and DC/DC and AC/DC conversion systems.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

DC/DC converters are widely used in rail transit, electric power, energy storage, high-power transmission, and other fields. Voltage divider units are indispensable parts of a DC/DC converter. In a voltage divider unit, in order to ensure normal circuit operations, it is necessary to meet balancing requirements. The balancing problems are often difficult to solve, which may require a significant number of samples in voltage signals or current signals, with implementations of control strategies in voltage/current balancing. As a result, the complexity and cost of the system can accordingly be increased.

In particular embodiments, the balancing problem of a voltage divider unit can be addressed by connecting an active load on the output side of the voltage divider unit, satisfying that the power flowing through the active load is positively correlated with the current power output by the front-stage circuit, and achieving the linkage control of the front-stage circuit and the rear-stage active load to achieve automatic balancing of the front-stage circuit.

Figure 1:
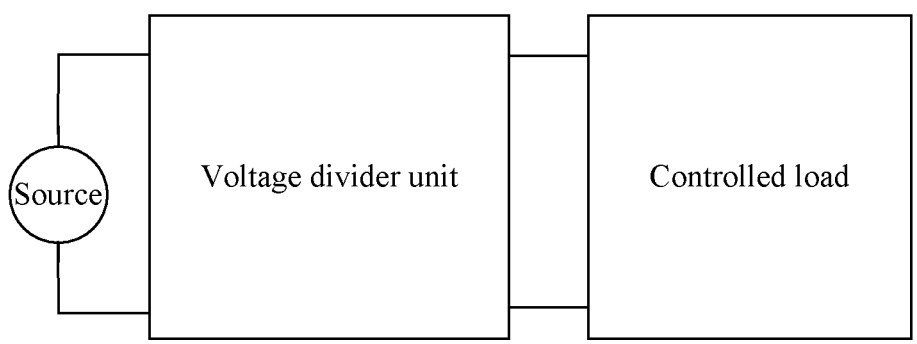
FIG. 1 is a schematic diagram of an example multilevel self-balance control circuit, in accordance with embodiments of the present invention.

As shown in FIG. 1, the front-stage circuit can be a voltage divider to be balanced, the rear-stage active load a controlled load network, and the rear-stage active load may present a negative feedback characteristic. This can automatically realize the voltage-balancing control of the front-stage circuit, and also realize the power change of the rear-stage active load. The front-stage circuit and the rear-stage active load can be under linkage control, and the control signal can be generated by the front-stage circuit and synchronized with switches of the rear-stage active load. Conversely, control signals may also be generated from the rear-stage active load, and synchronized with switches of the front-stage circuit.

Figure 2:
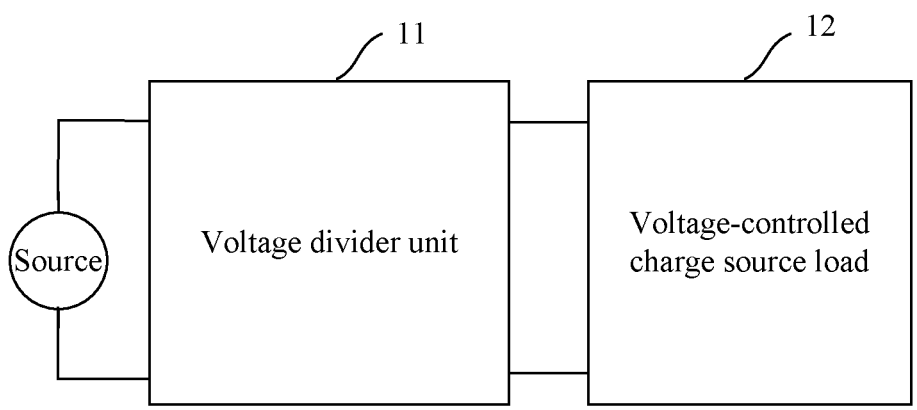
FIG. 2 is another schematic diagram of the example multilevel self-balance control circuit, in accordance with embodiments of the present invention.

As shown in FIG. 2, when the front-stage circuit is a voltage divider unit 11, the rear-stage active load is a voltage-controlled charge source load 12. In this particular example, voltage divider unit 11 can include switches and capacitors. Any suitable voltage divider circuit structure implemented by a combination of switches and capacitors can be utilized in certain embodiments. The front-stage circuit and the rear-stage active load may be controlled by control unit 13 to ensure that the total amount of charge flowing through the rear-stage active load is positively correlated with the output voltage of the current front-stage circuit within the period of each working state. That is, when the output voltage of the front-stage circuit increases, the total amount of charge flowing into the rear-stage active load can be increased. Conversely, when the output voltage of the front-stage circuit decreases, the total amount of charge flowing into the rear-stage active load may be decreased.

Figure 3:
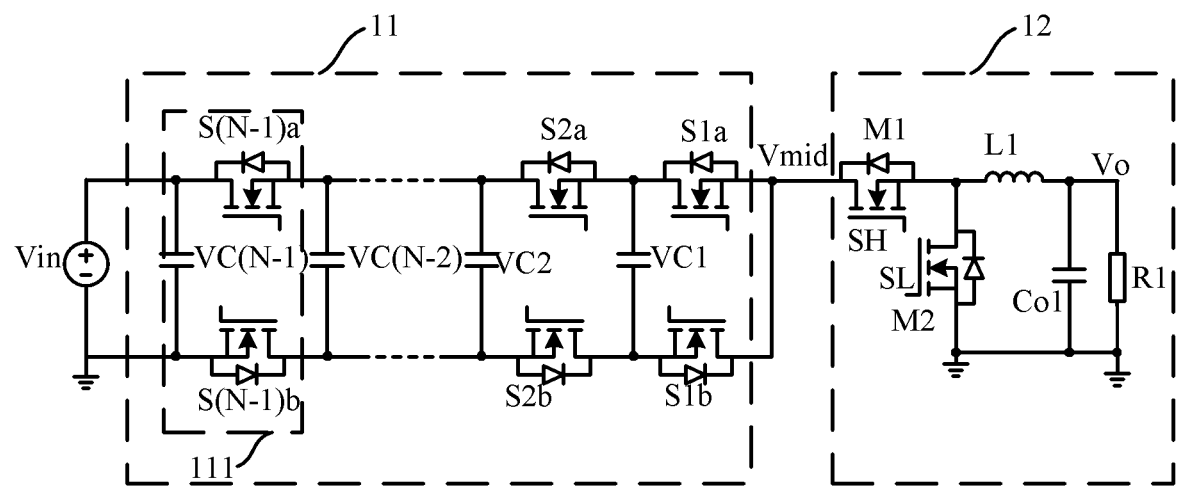
FIG. 3 is a schematic diagram of a first example implementation of a multilevel self-balance control circuit, in accordance with embodiments of the present invention.

As shown in FIGS. 2-7, a multilevel self-balance control circuit is provided, and the multilevel self-balance control circuit can include voltage divider unit 11, voltage-controlled charge source load 12, and control unit 13. As shown in FIGS. 2 and 3, voltage divider unit 11 may receive and divide input voltage Vin. As shown in FIG. 3, voltage divider unit 11 can be a flying capacitor converter. The flying capacitor converter can include N−1 stages of basic modules 111 cascaded sequentially. Each of the basic modules 111 can include a capacitor, a first switch, and a second switch. One terminal of the first switch in one of the stages can connect to the upper plate of a capacitor, and another terminal of the first switch can connect to the upper plate of a capacitor in the previous stage. The control terminal of the first switch can connect to a switch control signal. One terminal of the second switch of the present stage can connect to a lower plate of the present capacitor, and the other terminal of the second switch can connect to a lower plate of a capacitor in the previous stage. The control terminal of the second switch can connect to the switch control signal.

In particular embodiments, the first and second switches can be implemented by metal-oxide-semiconductor (MOS) transistors. Any devices that can be used as power switches may be selected for implementation in certain embodiments. The first and second switches in the same basic module can be complementarily conducted, and the basic modules at all stages are under phase-shifted control. That is, switch control signals for the first switches of all stages in the basic modules can be successively phase shifted with a preset angle, and switch control signals for the second switches of all stages in the basic modules can be in turn phase shifted with the preset angle. For example, N is an integer greater than or equal to 3. The voltages VC1–VC(N−1) across the capacitors in the first stage to the (N−1)th stage can respectively be Vin/(N−1), 2Vin/(N−1), . . . Vin. The withstand voltage of the switches in each stage of the basic module can be the voltage difference between the capacitors in the adjacent two modules; that is, Vin/(N−1). Therefore, the topology of the flying capacitor converter can reduce the voltage stress of the switches, such that low-voltage components can be used to meet the application requirements of high-voltage applications. The voltage balance effect of the flying capacitor converter may significantly affect the system performance. If the voltages are poorly balanced, the stress on the MOS transistors can be increased, which may cause damages and failures of the MOS transistors. Any suitable voltage divider circuit structure that requires balance control can be utilized in certain embodiments.

As shown in FIGS. 2 and 3, voltage-controlled charge source load 12 can connect to the output terminal of voltage divider unit 11. The input charge amount of voltage-controlled charge source load 12 may be adjusted based on the output voltage of the voltage divider 11 adaptively, such that the total amount of charge flowing through voltage-controlled charge source load 12 within the period of each working state of voltage divider unit 11 is positively correlated with output voltage Vmid of voltage divider unit 11. The balance control of voltage divider unit 11 can be achieved by negative feedback.

In the example of FIG. 3, voltage-controlled charge source load 12 may be a BUCK circuit. The BUCK circuit can include power transistor M1, power transistor M2, inductor L1, capacitor Co1, and load R1. In particular embodiments, each power transistor may be implemented by N-type metal oxide semiconductor (NMOS); however, other devices can alternatively be utilized in certain embodiments. The drain of power transistor M1 can connect to the output of voltage divider unit 11, with the gate receiving switch control signal SH. The source of power transistor M1 can connect to the drain of power transistor M2. The gate of power transistor M2 may receive switch control signal SL, with the source grounded. One terminal of inductor L1 can connect to the source of power transistor M1 (the drain of power transistor M2), and the other terminal thereof can be coupled to the ground via capacitor Co1. The load R1 can connect in parallel with capacitor Co1, and power transistors M1 and M2 may be complementarily conducted.

Figure 4:
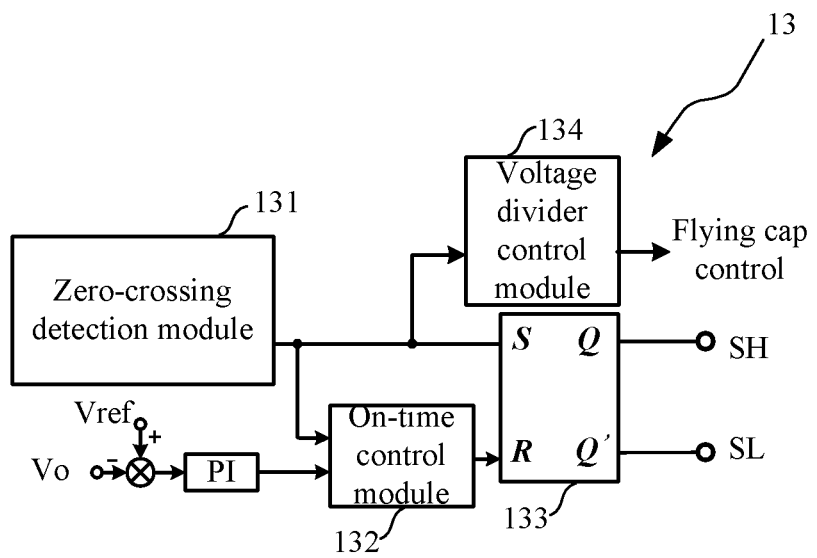
FIG. 4 is a schematic diagram of an example control unit, in accordance with embodiments of the present invention.

Any circuit structure capable of changing the amount of input charges based on the output voltage of voltage divider unit 11, and thereby achieving negative feedback to meet the characteristics of the voltage-controlled charge source, can be utilized in certain embodiments. As shown in FIGS. 3 and 4, control unit 13 may generate control signals for voltage divider unit 11 and voltage-controlled charge source load 12, thereby controlling voltage divider unit 11 and voltage-controlled charge source load 12 in linkage.

In particular embodiments, control unit 13 can control voltage-controlled charge source load 12 to operate in a critical conduction mode with a constant on-time (COT) control, and synchronously generate switch control signals to voltage divider unit 11 based on control signals for voltage-controlled charge source load 12. For example, control unit 13 may utilize a dual closed-loop COT control under the critical conduction mode. Here, the critical conduction mode is a valley current mode. Control unit 13 can include zero-crossing detection module 131, on-time control module 132, trigger 133, and voltage divider control module 134. Zero-crossing detection module 131 can detect a zero-crossing point of the inductor (e.g., inductor L1) current in voltage-controlled charge source load 12, and may generate a turn-on signal for a main switch in voltage-controlled charge source load 12. On-time control module 132 can connect to the output terminal of zero-crossing detection module 131 and may receive an on-time control signal generated based on the difference between output voltage Vo of voltage-controlled charge source load 12, and reference voltage Vref.

In particular embodiments, output voltage Vo can be acquired by a voltage outer loop, and subtracted from reference voltage Vref to obtain an error signal. The error signal can be passed through a proportional integral (PI) compensation network to generate the on-time control signal, which may represent an expected value of the duration of the on-time. The duration of the on-time can be timed from the zero-crossing point of the inductor until reaching the time represented by the on-time control signal; thus, a turn-off signal for the main switch may be generated. The input terminal of trigger 133 can connect to the output terminals of zero-crossing detection module 131 and on-time control module 132 to receive the turn-on signal and turn-off signal to generate the control signal. When the inductor current crosses zero, the turn-on signal for a main switch (e.g., power transistor M1) can be activated. When the main switch is on, the inductor can be in the energy storage state.

When the duration of on-time reaches the value represented by the on-time control signal, the turn-off signal for the main switch can be activated. In stable operation, the output voltage may be constant, so the on-time can be constant. For example, trigger 133 can include an RS flip-flop. The set terminal S of the RS flip-flop can connect to the output terminal of zero-crossing detection module 131, reset terminal R can connect to the output terminal of on-time control module 132, non-inverting output terminal Q can connect to the gate of power transistor M1 to generate the switch control signal SH for power transistor M1, and inverting output terminal Q' can connect to the gate of power transistor M2 to generate switch control signal SL for power transistor M2. For example, the turn-on signal for the main switch in BUCK circuit may also be a driving signal for synchronizing the front-stage flying capacitor converter. Voltage divider control module 134 can connect to the output terminal of zero-crossing detection module 131, synchronously generating the switch control signal for voltage divider unit 11 based on the zero-crossing detection signal. It should be understood that voltage divider control module 134 can also be coupled to one of the output terminals of trigger 133. For example, voltage divider control module 134 can be implemented by a state machine.

In particular embodiments, control unit 13 may be disposed in the rear-stage active load, and the front-stage control signal synchronized by the rear-stage control signal. For example, control unit 13 can synchronously generate switch control signals to voltage divider unit 11 based on the control signal for voltage-controlled charge source load 12. In some applications, control unit 13 may also be disposed in the front-stage circuit. In this case, control unit 13 in the front-stage circuit can detect the output of the rear-stage circuit to adjust the duration of the on-time, and may pass the signal to the rear-stage active load to control the on-time of the switch in the rear-stage active load. Since the valley current of the rear-stage active load can be required to be consistent, a turn-on signal for the rear-stage active load main switch may be generated by the rear-stage active load itself. The turn-on signal can be passed to the front-stage circuit for triggering the switching of the working state of the front-stage circuit, thereby forming switch control signals of the front-stage circuit. The control signals for the rear-stage active load (or front-stage circuit) can be synchronized with the control signals for the front-stage circuit (or the rear-stage active load) once per cycle, or periodically synchronized every M cycles, where M is an integer greater than 1.

Figure 5:
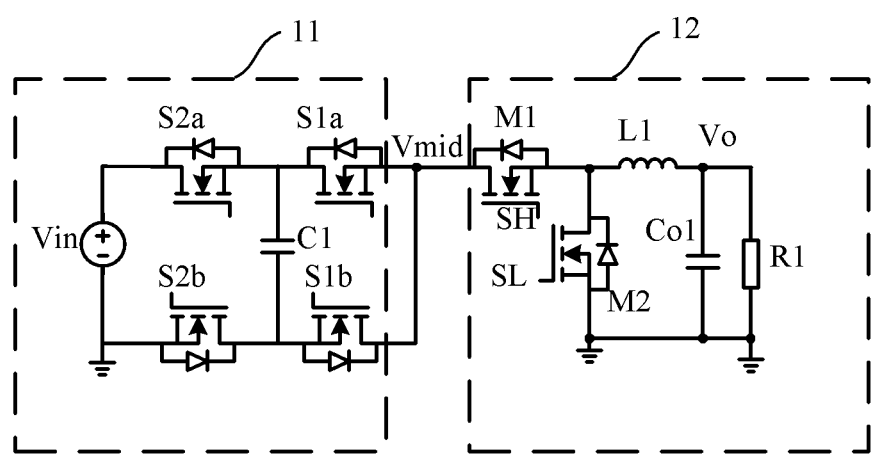
FIG. 5 is a schematic diagram of an example self-balance voltage three-level flying capacitor architecture based on the BUCK topology, in accordance with embodiments of the present invention.
Figure 6:
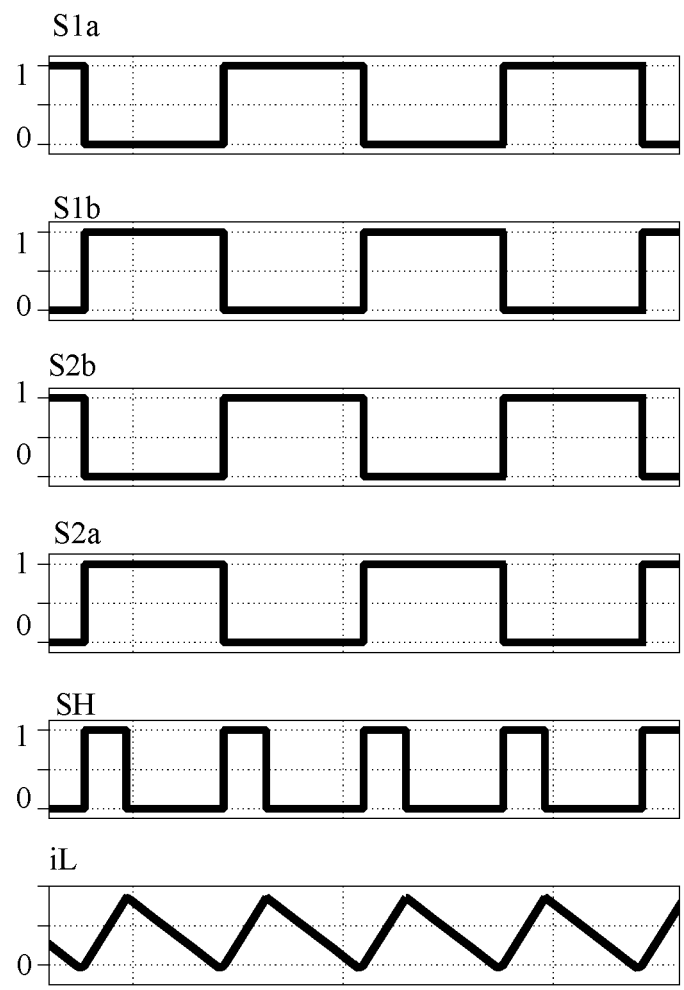
FIG. 6 is a waveform diagram of an example operation of a self-balance three-level flying capacitor architecture based on the BUCK topology under a condition that the rear-stage synchronizes the front stage once a cycle in the balanced state, in accordance with embodiments of the present invention.

A self-voltage-balancing three-level flying capacitor architecture based on the BUCK topology, is shown as an example to further illustrate the working principle of the multilevel self-balance control circuit of the present disclosure. FIG. 5 shows a self-balance voltage three-level flying capacitor architecture based on the BUCK topology, in accordance with embodiments of the present invention. FIG. 6 shows a schematic diagram of the driving waveform of the self-balance three-level flying capacitor architecture based on the BUCK topology under a condition that the rear-stage synchronizes the front stage once a cycle in the balanced state, in accordance with embodiments of the present invention. In the carrier phase-shifted control, switch control signals S1a and S1b can be mutually complementary, and switch control signals S2a and S2b may be mutually complementary. For example, switch control signal S1a can be phase shifted from the switch control signal S2a by 180°, and the duty cycles of all switches can be 0.5.

The switch control signals for the front-stage circuit may be synchronized with the turn-on signal for the main switch in the rear-stage BUCK circuit. Since the duty cycle of the flying capacitor converter is only 0.5, there can be N−1 working states in the flying capacitor converter including N−1 basic modules. In this example, there are two working states for the three-level flying capacitor converter (N=3). In the case of working state 1, switch control signals S1a and S2b can be active, where capacitor C1 is in a discharge mode. When in working state 2, switch control signals S1b and S2a can be active, and capacitor C1 may be in a charging mode. The BUCK circuit features as a voltage-controlled charge source when under both constant-on-time and valley current control. The duration of the on-time of the BUCK circuit can be determined by the outer loop voltage loop, and the turn-on signal decided by a zero-crossing detection (ZCD). When the inductor current crosses zero, the turn-on signal can be generated to turn on the main switch, and when the on-time reaches the expected value, a turn-off signal may be generated to turn off the main switch. The three-level flying capacitor converter can be synchronously triggered at the rising edge of the turn-on signal for the main switch to start the carrier phase-shifted control. That is, the three-level flying capacitor converter may complete the switching of the working states once within one switching cycle of the BUCK circuit. At every rising edge of the turn-on signal for the main switch, the working state of the three-level flying capacitor converter can be synchronously switched.

Figure 7:
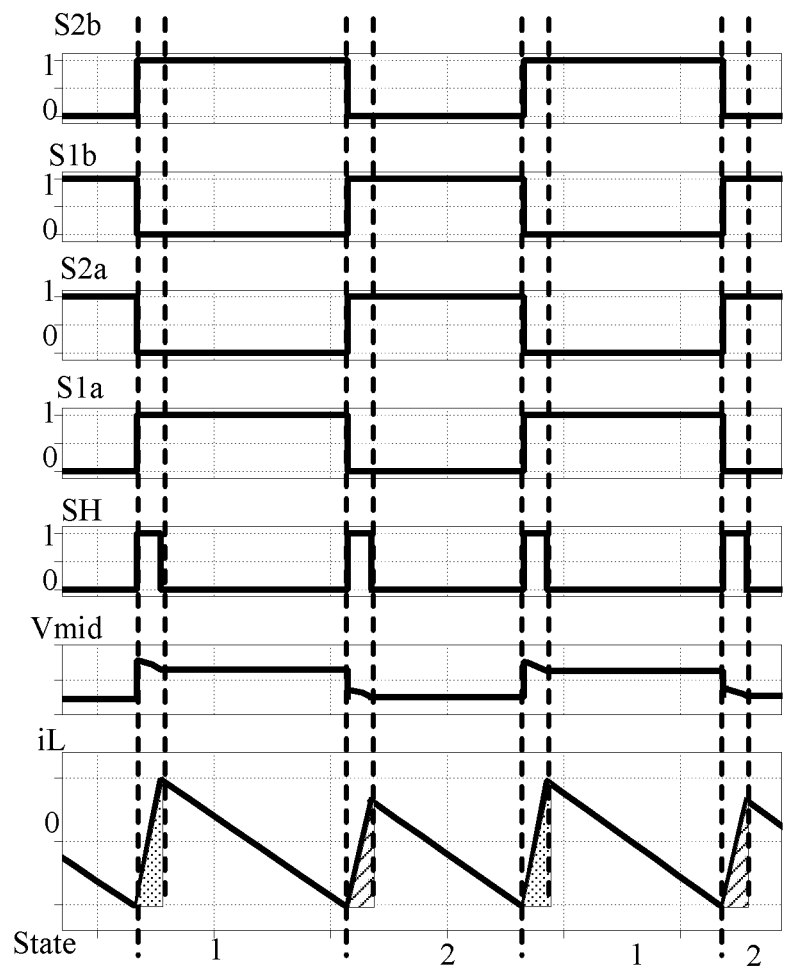
FIG. 7 is a waveform diagram of an example operation of a self-balance three-level flying capacitor architecture based on the BUCK topology under a condition that the rear-stage synchronizes the front stage once a cycle in the unbalanced state, in accordance with embodiments of the present invention.

For example, when voltage VC1 across capacitor C1 is unbalanced (that is, VC1≠½ Vin), such as when VC1 is higher, the principle of the voltage-balancing is as follows. As shown in FIG. 7, when capacitor C1 is in the discharge mode (State=1, the switch control signals S2b and S1a are active), voltage Vmid=VC1, which is higher than the balance point. Since the output voltage is constant, the on-time is constant, and thus the discharge amount of capacitor C1 is increased (the area of the dotted triangle region is increased). On the other hand, when capacitor C1 is in the charge mode (State=2, the switch control signals S2a and S1b are active), voltage Vmid=Vin−VC1, which is lower than the balance point. The charges provided into capacitor C1 can be decreased (the area of the linear triangle region is decreased). That is, when the voltage of capacitor C1 is higher than the balance point, the charging amount of capacitor C1 may be less than the discharge amount. With gradually accumulation over time, the voltage of capacitor C1 can be stabilized at the predetermined voltage level due to the negative feedback effect, thereby achieving voltage balancing. When the voltage of capacitor C1 is lower than the balance point, the operations are likewise.

Figure 8:
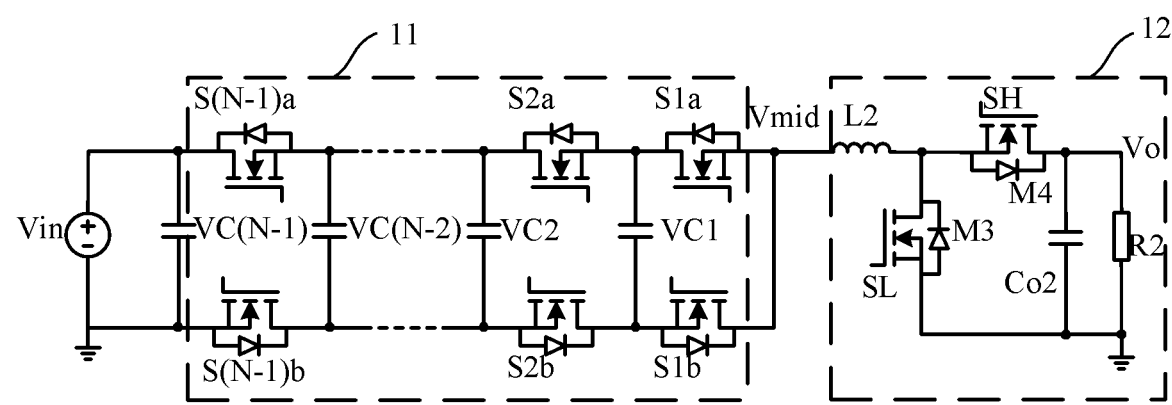
FIG. 8 is a schematic diagram of a second example implementation of a multilevel self-balance control circuit, in accordance with embodiments of the present invention.

As shown in FIGS. 2 and 8-12, the present invention provides an embodiment of a multilevel self-balance control circuit comprising: voltage divider unit 11, voltage-controlled charge source load 12, and control unit 13. As shown in FIGS. 2 and 8, voltage divider unit 11 may receive input voltage Vin, and divide input voltage Vin. For example, voltage divider unit 11 may utilize a flying capacitor converter. As shown in FIGS. 2 and 8, voltage-controlled charge source load 12 can connect to the output terminal of voltage divider unit 11. The amount of input charges to voltage-controlled charge source load 12 may be adjusted based on the output voltage of the voltage divider 11. Thus, the total amount of charges flowing through voltage-controlled charge source load 12 within the period of each working state of voltage divider unit 11 can be positively correlated with output voltage Vmid of voltage divider unit 11, and a negative feedback loop may be formed to achieve balance control of voltage divider unit 11.

In the example of FIG. 8, voltage-controlled charge source load 12 is a BOOST circuit. The BOOST circuit can include power transistor M3, power transistor M4, inductor L2, capacitor Co2, and load R2. For example, each power transistor may be implemented by NMOS. One terminal of inductor L2 can connect to the output terminal of voltage divider unit 11, and the other terminal of inductor L2 can connect to the drain of power transistor M3. The gate of power transistor M3 may receive switch control signal SL, whereas the source of power transistor M3 is grounded. The source of power transistor M4 can connect to the drain of power transistor M3, the gate of power transistor M4 may receive switch control signal SH, and the drain of power transistor M4 can be coupled to the ground through capacitor Co2. The load R2 can connect in parallel with capacitor Co2, and power transistors M3 and M4 may be complementarily conducted.

Figure 9:
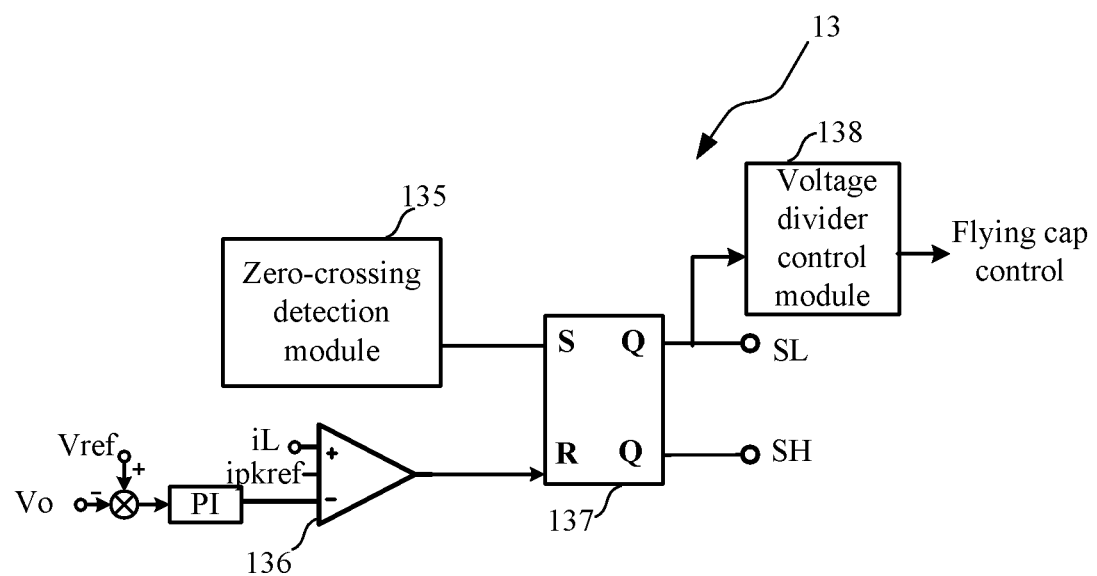
FIG. 9 is a schematic diagram of another example implementation of the control unit, in accordance with embodiments of the present invention.

Any circuit structure capable of changing the amount of input charges based on the output voltage of voltage divider unit 11, and thereby achieving negative feedback to meet the characteristics of the voltage-controlled charge source can be utilized in certain embodiments. As shown in FIGS. 8 and 9, control unit 13 may respectively generate control signals for voltage divider unit 11 and voltage-controlled charge source load 12, thereby controlling voltage divider unit 11 and voltage-controlled charge source load 12 in linkage.

In particular embodiments, control unit 13 can control voltage-controlled charge source load 12 to operate in a critical conduction mode, e.g., the peak current control mode, and may synchronously generate switch control signals to voltage divider unit 11 based on control signals for voltage-controlled charge source load 12. For example, control unit 13 employs a dual closed-loop peak current control mode. Control unit 13 can include zero-crossing detection module 135, comparison module 136, trigger 137, and voltage divider control module 138. Zero-crossing detection module 135 can detect a zero-crossing point of the current of the inductor (e.g., inductor L2) in voltage-controlled charge source load 12, and may generate a turn-on signal for a main switch in voltage-controlled charge source load 12. Comparison module 136 can compare internal loop peak reference current ipkref against inductor current iL to outputs a turn-off signal for the main switch. For example, output voltage Vo may be acquired by a voltage outer loop, an error signal is obtained by subtracting output voltage Vo from a reference voltage Vref, and the error signal passed through a proportional integral (PI) compensation network to generate the internal loop peak reference current. The input terminal of trigger 137 can connect to the output terminals of the zero-crossing detection module 135 and comparison module 136 to receive the turn-on signal and turn-off signal, in order to generate the control signal.

When the inductor current crosses zero, the turn-on signal for the main switch can be activated. When the inductor current reaches the internal loop peak reference current, the turn-off signal for the main switch (e.g., power transistor M3) may be activated. When the main switch is on, the inductor is in the energy storage state. For example, trigger 137 is implemented by RS flip-flop. The set terminal S of the RS flip-flop can connect to the output terminal of the zero-crossing detection module 135. Reset terminal R can connect to the output terminal of comparison module 136. The non-inverting output terminal Q can connect to the gate of power transistor M3 to generate switch control signal SL for power transistor M3, and inverting output terminal Q' can connect to the gate of power transistor M4 to generate switch control signal SH for power transistor M4. Voltage divider control module 138 can connect to the output terminal of trigger 137 (non-inverting output terminal or inverting output terminal), and may synchronously generate switch control signals to voltage divider unit 11 based on the output signals from trigger 137. It should be understood that voltage divider control module 138 can also be coupled to the output terminal of the zero-crossing detection module 135. In one example, voltage divider control module 138 is implemented by a state machine.

Figure 10:
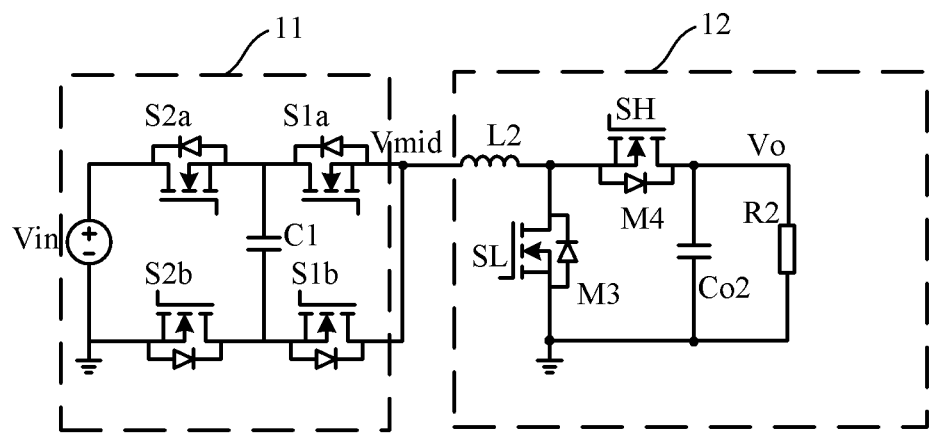
FIG. 10 is a schematic diagram of an example self-balance three-level flying capacitor architecture based on the BOOST topology, in accordance with embodiments of the present invention.
Figure 11:
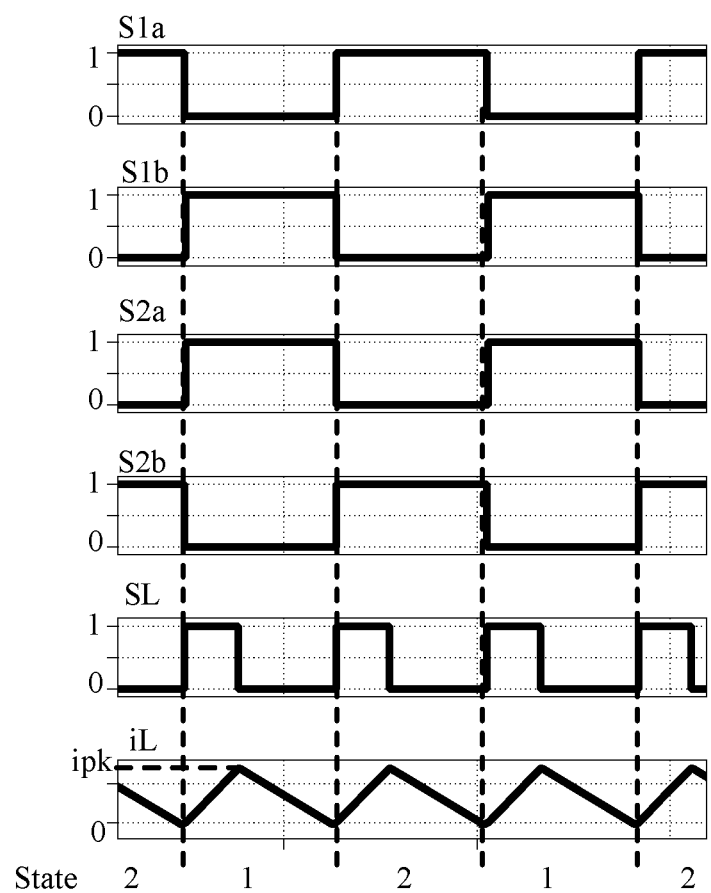
FIG. 11 is a schematic diagram of the example driving waveform of the self-balance three-level flying capacitor architecture based on the BOOST topology under a condition that the rear-stage synchronizes the front stage once a cycle in the balanced state, in accordance with embodiments of the present invention.
Figure 12:
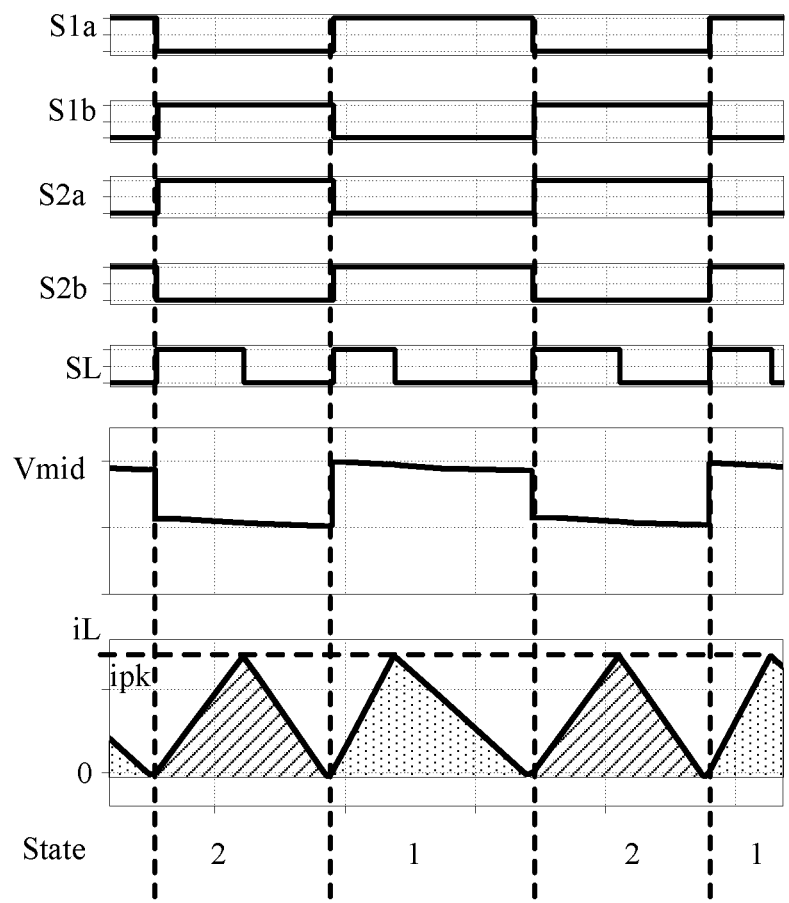
FIG. 12 is a schematic diagram of the example driving waveform of the self-balance three-level flying capacitor architecture based on the BOOST topology under a condition that the rear-stage synchronizes the front stage once a cycle in the unbalanced state, in accordance with embodiments of the present invention.

It is to be noted that the front-stage circuit may be synchronized by the rear-stage active load. On the other hand, the rear-stage active load can also be synchronized by the front-stage circuit. The synchronization may be performed once per cycle, or it can be synchronized every M cycles, where M is an integer greater than 1. A self-voltage-balancing three-level flying capacitor architecture based on the BOOST topology is served as an example to further illustrate the working principle of the multilevel self-balance control circuit of the present disclosure. FIG. 10 shows a self-balance three-level flying capacitor architecture based on the BOOST topology, in accordance with embodiments of the present invention. FIG. 11 shows a schematic diagram of the driving waveform of the self-balance three-level flying capacitor architecture based on the BOOST topology under a condition that the rear-stage synchronizes the front stage once a cycle in the balanced state, in accordance with embodiments of the present invention. When voltage VC1 across capacitor C1 is balanced (e.g., VC1=½ Vin), Vmid can be a constant voltage with a value of Vin/(N−1), and for a three-level flying capacitor circuit, Vmid=Vin/2.

Figure 13:
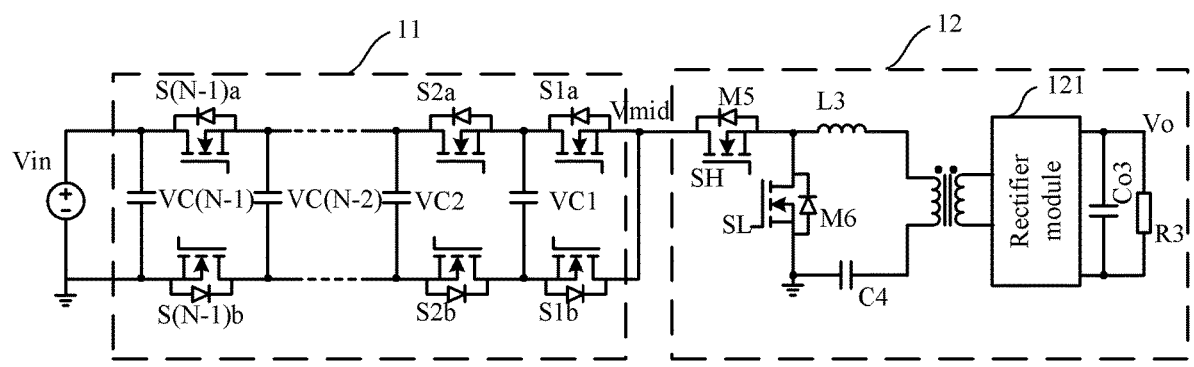
FIG. 13 is a schematic diagram of a third example implementation of a multilevel self-balance control circuit, in accordance with embodiments of the present invention.

When voltage VC1 across capacitor C1 is unbalanced (e.g., VC1≠½ Vin), automatic voltage balancing can be achieved if Vmid>½ Vo. As shown in FIG. 13, when VC1 is higher than a balance point, the principle of the voltage-balancing is as follows. When capacitor C1 is in the discharge mode (e.g., switch control signals S2b and S1a are active), voltage Vmid=VC1 can be over the balance point. According to the volt-second equilibrium of Boost circuit, it can be deduced that when voltage Vmid>½ Vo, the switching period of the Boost circuit increases. Since the peak current remains constant under the stable operation, the discharge amount of capacitor C1 can be increased. That is, the area of the dotted triangle region is increased. On the other hand, when capacitor C1 is in the charging mode (e.g., when switch control signals S2a and S1b are active), voltage Vmid=Vin−VC1 may be below the balance point, resulting in a decrease in the charging amount of capacitor C1. That is, the area of the linear triangle region can be decreased. Therefore, when the voltage of capacitor C1 exceeds the balance point, the voltage of capacitor C1 eventually gets stabilized at the rated voltage due to the negative feedback effects, in order to achieve voltage balance. In the event that the voltage of capacitor C1 is lower than the balance point, analogous operations can occur.

As shown in FIGS. 2 and 13-15, an example multilevel self-balance control circuit can include voltage divider unit 11, voltage-controlled charge source load 12, and control unit 13. As shown in FIGS. 2 and 13, voltage divider unit 11 may receive an input voltage Vin and divides input voltage Vin. For example, voltage divider unit 11 may employ a flying capacitor converter as described above. As shown in FIGS. 2 and 13, voltage-controlled charge source load 12 can connect to the output terminal of voltage divider unit 11. The amount of input charges to voltage-controlled charge source load 12 may be adaptively adjusted based on the output voltage of voltage divider unit 11. Thus, the total amount of charges flowing through voltage-controlled charge source load 12 within the period of each working state of voltage divider unit 11 can be positively correlated with the output voltage of voltage divider unit 11. Balance control of voltage divider unit 11 may thereby by achieved by a negative feedback loop.

As shown in the example of FIG. 13, voltage-controlled charge source load 12 is a DCX-LLC circuit (DC conversion circuit with a transformer based on LLC resonance). For example, the DCX-LLC circuit can include power transistor M5, power transistor M6, inductor L3, capacitor Co3, transformer, rectifier module 121, capacitor C4, and load R3. In this particular example, each power transistor may be implemented using NMOS. The drain of power transistor M5 can connect to the output terminal of voltage divider unit 11. The gate of power transistor M5 may receive switch control signal SH, and the source of power transistor M5 can connect to the drain of power transistor M6. The gate of power transistor M6 may receive switch control signal SL, whereas the source of power transistor M6 may be grounded. One terminal of inductor L3 can connect to the source of power transistor M5, and the other terminal can be coupled to the ground via the primary coil of the transformer and capacitor C4. The secondary coil of the transformer can connect to the input terminal of the rectifier module 121. Capacitor Co3 and load R3 can connect in parallel between the two output terminals of the rectifier module 121, and power transistors M5 and M6 may be complementarily operated.

Any circuit structure capable of changing the amount of input charges based on the output voltage of voltage divider unit 11, and thereby achieving negative feedback to meet the characteristics of the voltage-controlled charge source can be utilized in certain embodiments. As shown in FIGS. 2 and 13, the control unit may generate control signals for voltage divider unit 11 and voltage-controlled charge source load 12, and can control voltage divider unit 11, and voltage-controlled charge source load 12 in linkage. In particular embodiments, control unit 13 can control voltage-controlled charge source load 12 under a constant frequency control mode, and may synchronously generate switch control signals to voltage divider unit 11 based on the control signals for voltage-controlled charge source load 12. Any control circuit structure capable of achieving a fixed frequency control mode can be utilized in certain embodiments. It is to be noted that the front-stage circuit may be synchronized by the rear-stage active load. On the other hand, the rear-stage active load can also be synchronized by the front-stage circuit. The synchronization may be performed once per cycle, or it can be synchronized every M cycles, where M is an integer greater than 1.

Figure 14:
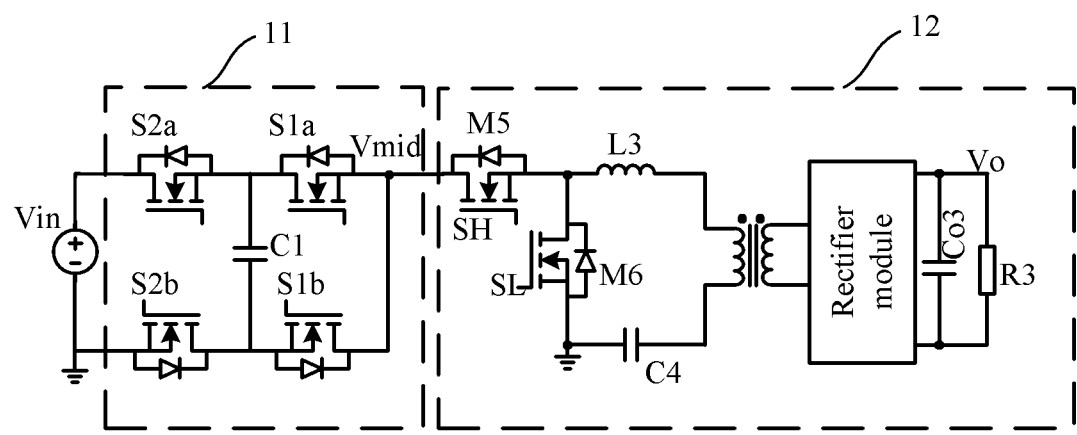
FIG. 14 is a schematic diagram of an example self-balance three-level flying capacitor architecture based on the DCX(DC transformer)-LLC topology, in accordance with embodiments of the present invention.
Figure 15:
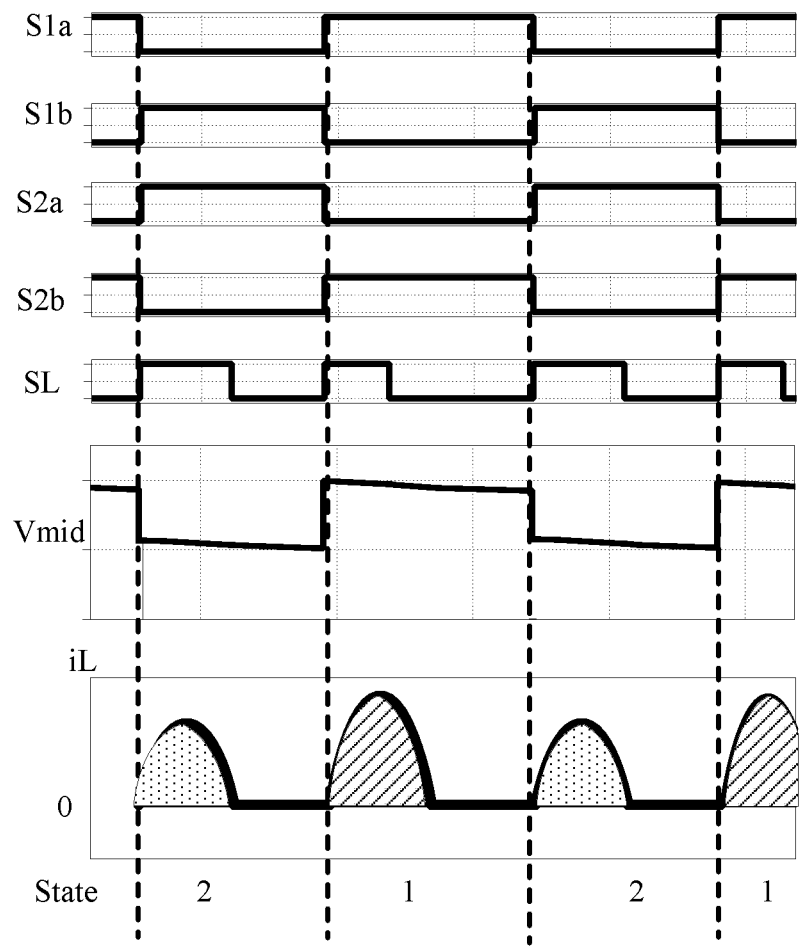
FIG. 15 is a waveform diagram of example operation of the self-balance three-level flying capacitor architecture based on the DCX-LLC topology under a condition that the rear-stage synchronizes the front stage once a cycle in the unbalanced state, in accordance with embodiments of the present invention.

A self-voltage-balancing three-level flying capacitor architecture based on the DCX-LLC topology is served as an example to further illustrate the working principle of the multilevel self-balance control circuit of particular embodiments. FIG. 14 shows a self-balance three-level flying capacitor architecture based on the DCX-LLC topology. For example, voltage VC1 across capacitor C1 is higher, the balancing process can be shown in FIG. 16. When capacitor C1 is in the discharge mode, voltage Vmid=VC1 exceeds the balance point. Consequently, the rear-stage LLC resonant current increases, resulting in a higher discharge amount. That is, the area of the linear region may be increased. When capacitor C1 is in the charging mode, voltage Vmid=Vin−VC1 can go below the balance point. In this case, the rear-stage LLC resonant current can decrease, resulting in less charging amount. That is, the area of the dot-shaped region is reduced. Eventually, a negative feedback loop may be formed to achieve voltage balancing of the front-stage circuit. When the voltage of capacitor C1 is below the balance point, same principle of operation is applicable as discussed.

Figure 16:
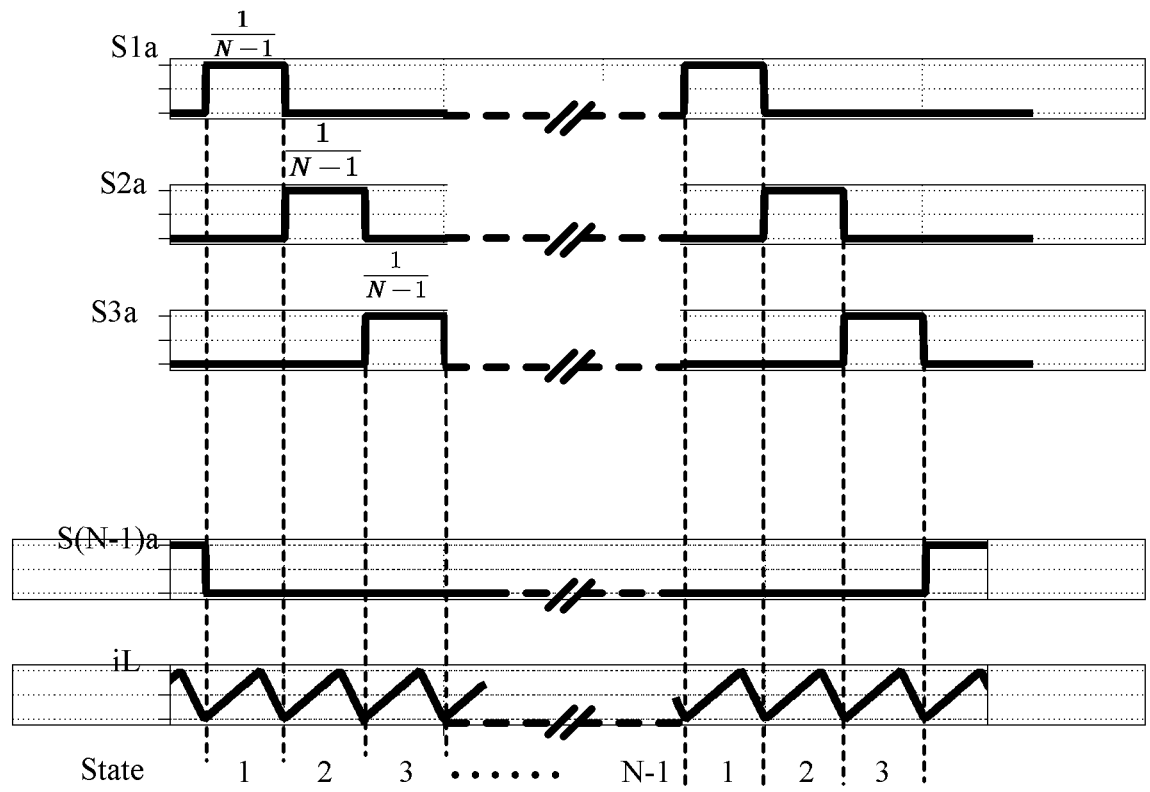
FIG. 16 is a waveform diagram of an example control of the N-level self-balance flying capacitor architecture, in accordance with embodiments of the present invention.

In particular embodiments, circuitry is not limited to the BUCK circuit, the Boost circuit, or the DCX-LLC circuit, as shown. Further, the control strategy is not limited to the COT-controlled critical conduction mode, the peak-current controlled critical conduction mode, or the fixed-frequency control mode. The relationships between the topology circuits and the control strategies are not limited to the correspondences exemplified herein, and various suitable implementations can be supported in certain embodiments. Particular embodiments may not require a complex control algorithm to achieve automatic voltage balancing of the system. Rather, the amount of charges input to the rear-stage active load can be changed based on the output voltage Vmid of the front-stage circuit, thereby forming a negative feedback loop to balance the voltages of the capacitors in the front-stage circuit. Regarding a more general N-level self-voltage-balancing flying capacitor architecture, the control waveform can be as shown in FIG. 16. For example, the front-stage circuit has a total of N−1 different working states. The turn-on signal of the rear-stage BUCK circuit can synchronize the switching of the working states of the front-stage circuit. In another example, the turn-on signal of the rear-stage active load can be used to synchronize the front-stage circuit once every N cycles.

Particular embodiments may provide a DC/DC conversion system that can include a DC power supply and a multilevel self-balance control circuit, as described herein. The DC power supply can be coupled to the input of the multilevel self-balance control circuit. Particular embodiments may also provide an AC/DC conversion system that can include an AC power supply, a rectifier circuit, and a multilevel self-balance control circuit, as described herein. The input terminal of the rectifier circuit can be coupled to the AC power supply, and the output coupled to the input terminal of the multilevel self-balance control circuit.

In particular embodiments, a multilevel self-balance control circuit, a DC/DC conversion system, and an AC/DC conversion system, may be provided. The multilevel self-balance control circuit can include: a voltage divider unit, which may receive and divide an input voltage; a voltage-controlled charge source load coupled to the output terminal of the voltage divider unit, and adaptively adjusting the amount of charges input to the voltage-controlled charge source load based on the output voltage of the voltage divider unit. Thus, a total amount of charges flowing through the voltage-controlled charge source load during the period of each working state of the voltage divider unit may be positively correlated with the output voltage of the voltage divider unit, and the balance control of the voltage divider unit can thereby be realized by a negative feedback loop. The multilevel self-balance control circuit can also include the control unit, which can generate the control signals for the voltage divider unit and the voltage-controlled charge source load, and control the voltage divider unit and the voltage-controlled charge source load in linkage. In the multilevel self-balance control circuit, the DC/DC conversion system, and the AC/DC conversion system of particular embodiments, an active load can be coupled to the output side of the voltage divider unit, and the power flowing through the active load may be positively correlated with the output power of the current voltage divider unit. Thus, automatic balancing of the voltage divider unit may be realized by a negative feedback loop. The front-stage circuit and the rear-stage active load can be simultaneously controlled to reduce the need for current or voltage sampling and control, thereby saving system cost and reducing system complexity.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A multilevel self-balance control circuit, comprising:
   a) a voltage divider unit configured to receive and divide an input voltage;
   b) a voltage-controlled charge source load coupled to an output terminal of the voltage divider unit, and being configured to adjust charge amount input to the voltage-controlled charge source load based on an output voltage of the voltage divider unit, such that a total amount of charges flowing through the voltage-controlled charge source load during a period of each working state of the voltage divider unit is positively correlated with the output voltage of the voltage divider unit, thereby forming a negative feedback loop to achieve voltage balancing of the voltage divider unit;
   c) a control unit configured to generate control signals for the voltage divider unit and the voltage-controlled charge source load, thereby coordinately controlling the voltage divider unit and the voltage-controlled charge source load; and
   d) wherein the control unit controls the voltage-controlled charge source load under a critical conduction mode based on a constant on-time control, and synchronously generates switch control signals for the voltage divider unit based on the control signals for the voltage-controlled charge source load.

2. The multilevel self-balance control circuit of claim 1, wherein a structure of the voltage divider unit is a topology comprising switches and at least one capacitor, in order to generate the output voltage proportional to the input voltage to realize voltage divider.

3. The multilevel self-balance control circuit of claim 2, wherein:
   a) the voltage divider unit comprises a flying capacitor converter having N−1 stages of basic modules cascaded sequentially, wherein each stage of the basic modules comprises a capacitor, a first switch, and a second switch;
   b) a first terminal of the first switch of one stage is coupled to an upper plate of the capacitor of the stage, and wherein a second terminal of the first switch is coupled to an upper plate a capacitor of a previous stage;
   c) a first terminal of the second switch of the stage is coupled to a lower plate of the capacitor of the stage, a second terminal of the second switch is coupled to the lower plate of the capacitor of the previous stage;
   d) the first switch and the second switch in same stage are turned on and off in a complementary manner;
   e) the first switches of each stage are sequentially under phase-shifted control with a preset angle; and
   f) N is an integer greater than or equal to 3.

4. The multilevel self-balance control circuit of claim 2, wherein the voltage-controlled charge source load is a BUCK circuit, a BOOST circuit, or a DC conversion circuit with a transformer based on LLC resonance.

5. The multilevel self-balance control circuit of claim 4, wherein the control unit synchronously generates switch control signals for the voltage divider unit based on the control signals for the voltage-controlled charge source load.

6. The multilevel self-balance control circuit of claim 5, wherein the control unit controls the voltage-controlled charge source load based on a fixed frequency control mode, and synchronously generates switch control signals to the voltage divider unit based on control signals coupled to the voltage-controlled charge source load.

7. The multilevel self-balance control circuit of claim 1, wherein the control unit is configured to control a main switch in the voltage-controlled charge source load to be turned on when an inductor current of the voltage-controlled charge source load crosses zero, and to be turned off when a duration of an on-time of the main switch reaches an expected value, wherein the expected value is generated based on a difference between an output voltage of the voltage-controlled charge source load and a reference voltage.

8. The multilevel self-balance control circuit of claim 7, wherein switching states of the switches in the voltage divider unit are triggered to be switched according to turn-on moments of the main switch, thereby switching working states of the voltage divider unit.

9. The multilevel self-balance control circuit of claim 8, wherein the working states of the voltage divider unit are switched at the turn-on moment of the main switch every M duty cycles, and M is a positive integer.

10. The multilevel self-balance control circuit of claim 7, wherein the control unit comprises:
    a) a zero-crossing detection module configured to detect a zero-crossing point of the inductor current of the voltage-controlled charge source load to generate the turn-on signal;
    b) an on-time control module coupled to an output terminal of the zero-crossing detection module, and being configured to time the duration of the on-time of the main switch in the voltage-controlled charge source load and generate a turn-off signal when the duration of the on-time of the main switch reaches the expected value; and c) a trigger configured to receive the turn-on signal and the turn-off signal to generate the control signals for the voltage-controlled charge source load.

11. The multilevel self-balance control circuit of claim 10, further comprising a voltage divider control module coupled to the output terminal of the zero-crossing detection module or an output terminal of the trigger, and being configured to control the voltage divider unit to switch the working states according to the turn-on signal for the main switch.

12. The multilevel self-balance control circuit of claim 1, wherein an input terminal of the multilevel self-balance control circuit receives a DC power supply or receives an AC power supply via a rectify circuit.

13. A DC/DC conversion system, comprising the multilevel self-balance control circuit of claim 1, and further comprising:
   a) a DC power supply; and
   b) wherein the DC power supply is connected to an input terminal of the multilevel self-balancing control circuit.

14. A multilevel self-balance control circuit, comprising:
   a) a voltage divider unit configured to receive and divide an input voltage;
   b) a voltage-controlled charge source load coupled to an output terminal of the voltage divider unit, and being configured to adjust charge amount input to the voltage-controlled charge source load based on an output voltage of the voltage divider unit, such that a total amount of charges flowing through the voltage-controlled charge source load during a period of each working state of the voltage divider unit is positively correlated with the output voltage of the voltage divider unit, thereby forming a negative feedback loop to achieve voltage balancing of the voltage divider unit;
   c) a control unit configured to generate control signals for the voltage divider unit and the voltage-controlled charge source load, thereby coordinately controlling the voltage divider unit and the voltage-controlled charge source load; and
   d) wherein the control unit controls the voltage-controlled charge source load to operate under a critical conduction mode with a peak current control, and synchronously generates switch control signals to the voltage divider unit based on the control signals for the voltage-controlled charge source load.

15. The multilevel self-balance control circuit of claim 14, wherein:
   a) the control unit is configured to control a main switch in the voltage-controlled charge source load to be turned on when an inductor current of the voltage-controlled charge source load crosses zero, and to be turned off when the inductor current reaches a peak reference current; and
   b) the peak reference current is generated based on a difference between an output voltage of the voltage-controlled charge source load and a reference voltage.

16. The multilevel self-balance control circuit of claim 15, wherein the control unit comprises:
   a) a zero-crossing detection module configured to detect a zero-crossing point of the inductor current in the voltage-controlled charge source load and to generate a turn-on signal for the main switch;
   b) a comparison module configured to compare the peak reference current against the inductor current to output a turn-off signal for the main switch; and
   c) a trigger configured to receive the turn-on signal and the turn-off signal to generate the control signals for the voltage-controlled charge source load.

17. The multilevel self-balance control circuit of claim 16, wherein the control unit further comprises a voltage divider control module coupled to an output terminal of the trigger or an output terminal of the zero-crossing detection module, and being configured to control working states of the voltage divider unit to be switched according to the turn-on signal for the main switch.

* * * * *